Dec. 18, 1951     C. ARNE     2,578,658
STABILIZING MEANS FOR LIFTER ROOF TANKS
Filed March 2, 1950     2 SHEETS—SHEET 1
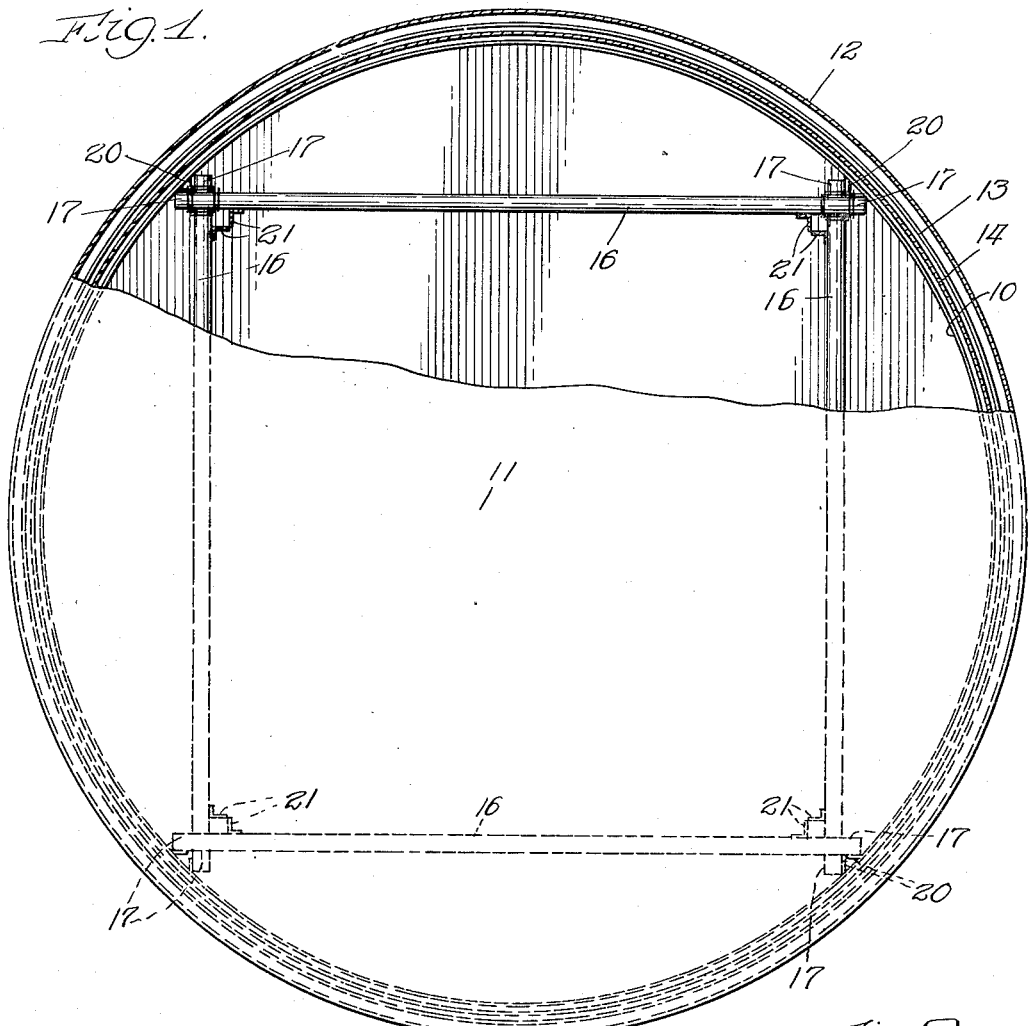
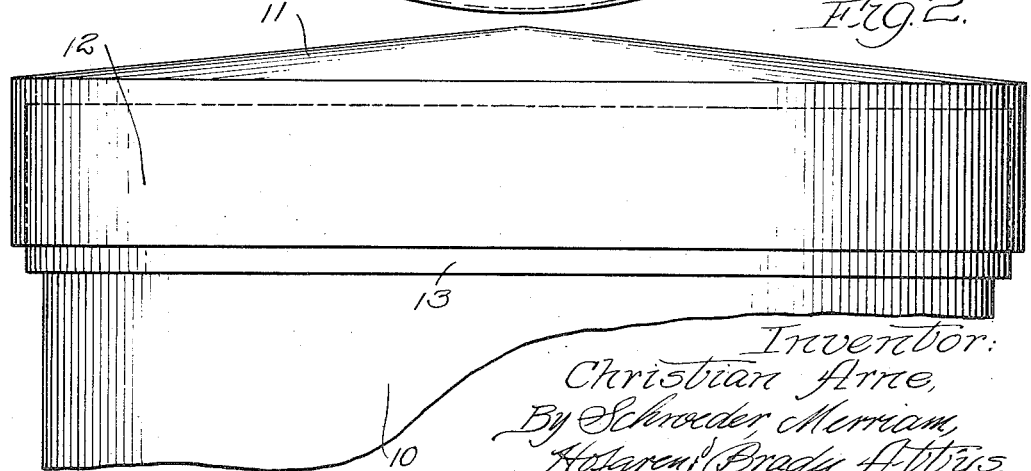

Dec. 18, 1951     C. ARNE     2,578,658
STABILIZING MEANS FOR LIFTER ROOF TANKS
Filed March 2, 1950     2 SHEETS—SHEET 2
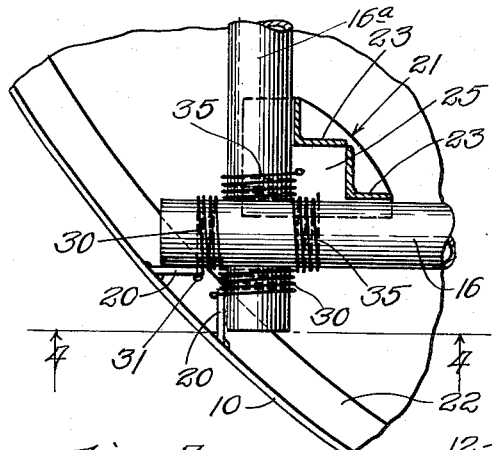
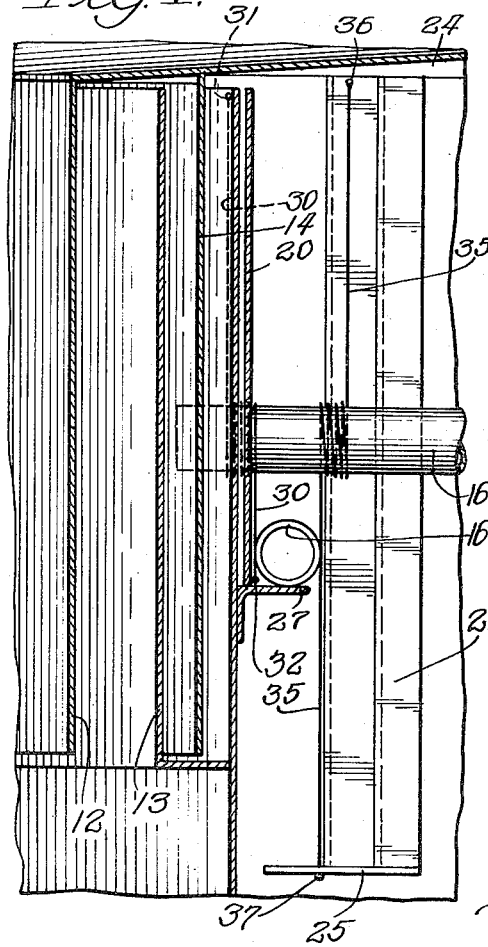

Patented Dec. 18, 1951

2,578,658

UNITED STATES PATENT OFFICE 2,578,658

STABILIZING MEANS FOR LIFTER ROOF TANKS

Christian Arne, Chicago, Ill., assignor to Chicago Bridge & Iron Company, a corporation of Illinois Application March 2, 1950, Serial No. 147,263

12 Claims. (Cl. 48—176)

1

This invention relates to a lifter roof tank and particularly to a stabilizing and guide means for such a tank.

Lifter roof tanks are used for the storage of gas or liquid and gas. As the pressure within the tank increases and decreases the roof thereover rises and falls. The lifter roof is positioned over the shell of the tank which constitutes the main storage portion and sealing means, which may be either a dry seal or a wet seal, is provided between the lifter roof and the shell of the tank. It is desirable that the lifter roof be maintained level over the shell and be prevented from lateral or rotational movement with reference to the shell even under conditions of unbalanced loading such as may occur as the result of snow load or wind pressure.

The present invention provides an improved stabilizing and guide means for maintaining the lifter roof level at all times regardless of the load placed thereon. The guide means of this invention prevents rotational movement of the roof on the shell and maintains the roof centered over the shell. The invention comprises broadly a plurality of substantially horizontal shafts or rollers within the shell mounted between substantially vertical guides with one of the guides attached to the shell and the other attached to and movable with the roof; and a plurality of cables so arranged and attached to the shell and the roof and wound around the shafts so that the shafts roll upon the cables when rising or falling with vertical movement of the roof.

The invention will be described with reference to a particular embodiment thereof illustrated in the accompanying drawings.

Fig. 1 of the drawings is a plan view of a lifter roof tank with the stabilizing and guide means of this invention installed therein, with part of the roof cut away for clarity of illustration;

Fig. 2 is a broken elevation of a lifter roof tank showing the position of the lifter roof over the shell;

Fig. 3 is an enlarged plan view fragmentarily showing the ends of two adjacent rollers of a stabilizing and guide means of this invention;

Fig. 4 is a fragmentary elevation partly in section taken substantially along line 4—4 in Fig. 3 and showing the roof in its lower position; and Fig. 5 is a view similar to Fig. 4 showing the roof elevated to its upper position.

The lifter roof tank comprises a shell 10 generally of cylindrical configuration having a roof 11 mounted thereover with a weather skirt 12

2 extending downwardly around the upper portion of the shell 10. In the embodiment illustrated, a seal trough 13 is placed around the upper portion of the shell 10 and is adapted to contain a sealing fluid. The lifter roof 11 has a dip skirt 14 extending downwardly from the upper portion of the roof and adapted to dip into the sealing liquid in the seal trough 13 to effect a gas-tight seal between the shell 10 and the roof 11. The sealing means between the seal and roof illustrated is termed a "wet seal;" however, the invention is equally applicable to a lifter tank employing a dry seal which ordinarily is fabric impregnated with a flexible impervious solid such as synthetic rubber. Such a fabric may be secured between the upper portion of the shell 10 and a portion of the lifter roof 11 to effect a seal therebetween.

Both the stabilizing and guide means of this invention is accomplished in part by the utilization of substantially horizontal shafts or rollers mounted within the shell. As illustrated in Fig. 1 a plurality of elongated shafts 16, here shown as four in number, are mounted within the shell and describe a polygon in plan. As better illustrated in Figs. 4 and 5 the shafts or rollers 16 are mounted within the shell near the top thereof and adjacent shafts or rollers are spaced vertically, relative one to the other, with their end portions 17 overlapping. The number of shafts employed in a given tank will be determined by the size of the tank and the amount of load to which the lifter roof will be subjected. The shafts or rollers 16 may be solid or may be pipes.

Each of the rollers 16 are mounted between fixed guides 20 and movable guides 21. The fixed guides 20 are attached to the shell 10 and are adapted to bear against the ends of the rollers 16. The guides 20 extend substantially vertically on the shell and also serve to strengthen the seal trough. An angle iron 27 is placed at the bottom of each fixed guide 20 and another angle iron 22 is positioned at the top of the fixed guides 20 to limit the upward and downward travel of the shafts 16.

The movable guides 21 are made up of two angle irons 23 supported from a roof truss 24 and having a bottom plate 25. The shafts 16 roll in contact with both the fixed guides 20 and the movable guides 21 with rise and fall of the roof. While the tank is illustrated in the drawings as having the guides 20 and 21 placed at the ends of the rollers 16, the guides may be placed at other points along the rollers as desired. The rollers 16 bear against the guides 20 and 21 to keep the roof centered over the shell and at the same time prevent rotation of the roof.

The stabilizing or leveling means comprises a pair of cables each wound around the end of a roller in opposite direction so that upon rise or fall of the roof the cables feed on and off the rollers or shafts. As best seen in Fig. 3 one of the cables 30 is attached at 31 to the shell from where it extends downwardly and is wrapped about the upper shaft 16, then extends further downwardly and in turn is wrapped about the lower shaft 16a and attached to the shell at the point 32. The other cable 35 is attached to the roof at 36 and extends downwardly and is wrapped first around the upper shaft 16 and then around the lower shaft 16a and extends downwardly to be fastened on the lower plate 25 on the movable guides 21 at the point 37. The cables 30 and 35 are wrapped around each shaft 16 in opposite directions so that the weight of the shafts is carried on the cables and relative movement between the shell and the roof causes the shafts to move upwardly or downwardly and at the same time roll upon the cables. The cables are generally given a sufficient number of turns about the rollers so that one point on the cable may be fastened to the roller to prevent slipping. Also the cables are held taut so that there is very little play between the cable and the shaft. If desired, the cables may be wire rope, nylon rope, chains or other material and the shafts may be provided with drums or wheels for feeding the cables therearound. Two cables may be substituted for each single cable, as for example, two cables may replace the cable 35, each of the substituted cables being fastened to the rollers and extending either above or below to a point of attachment to the roof.

Illustration of the operation of the stabilizing may be described with reference to Figs. 4 and 5. In Fig. 4 the roof is in its lower position and upon rising the cable 35 must feed from the upper shaft 16 and at the same time the shaft roll upwardly upon the cable 30. As the relative movements between the cables 30 and 35 and the shaft 16 occur, the shaft 16 transfers that relative movement to the opposite adjacent corner of the polygon, rolling on the cables there and causing the roof over that apex of the polygon to rise a like amount. As seen in Fig. 4, the upper portion of cable 35 is placed in tension as the roof starts to rise. Transfer of this force through shaft 16 places tension in the lower portion of cable 30. At the opposite end of roller 16, the upper portion of the cable attached to the shell and the lower portion of the cable attached to the roof will be in tension to raise that portion of the roof a like amount.

Since the cables 30 and 35 are wound about two adjacent shafts 16, the movement of the roof over that apex of the polygon is transferred to two adjacent corners of the polygon and in turn to the other apices of the polygon thereby ensuring that all portions of the roof will rise or fall, as the case may be, together, maintaining the roof level.

If desired, cables may be attached to the shafts between the apices of the polygon and/or additional polygons may be installed within the tank to give greater stability. Also the greater number of sides used in a given polygon installed in the tank will generally provide more points of attachment for the cables and secure a more stable structure.

While I have herein shown and described a particular embodiment of this invention it is my intention that the invention be not limited by any of the details of the description unless otherwise specified, but rather be construed broadly within its spirit and scope as set out in the accompanying claims.

I claim:

1. In a lifter roof tank having a shell and a roof thereover adapted to rise and fall with increasing and decreasing gas pressure within the shell, a stabilizing means comprising a plurality of substantially horizontal floating shafts arranged around the interior of the shell, first flexible members attached at their ends respectively to upper and lower portions of the shell, the intermediate portion of each first member being wrapped in one direction about a shaft, second flexible members attached at their ends respectively to upper and lower portions of the roof, the intermediate portion of each second member being wrapped in an opposite direction about a shaft, said flexible members being taut whereby rise and fall of the roof feeds said members about the shafts while rotating the shafts to maintain the roof level.

2. The stabilizing means of claim 1 wherein two first flexible members and two second flexible members are wrapped about each shaft.

3. In a lifter roof tank including a shell and a roof thereover adapted to rise and fall with increasing and decreasing gas pressure within the shell, a stabilizing means comprising a plurality of substantially horizontal floating shafts arranged around the interior of the shell, a pair of flexible members each wrapped in opposite direction around the ends of each shaft, said flexible members being taut and extending in a generally vertical direction with one of said pair being attached to upper and lower portions of the shell and the other of said pair being attached to upper and lower portions of the roof whereby rise and fall of said roof feeds the flexible members about the shafts.

4. The stabilizing means of claim 3 wherein each flexible member is wrapped successively around two adjacent shafts.

5. The stabilizing means of claim 3 wherein said shafts form a polygon within the shell with adjacent shafts being spaced vertically and having their ends overlapped and each flexible member is wrapped successively around the overlapped ends of the shafts.

6. The stabilizing means of claim 3 wherein said shafts have their ends respectively adjacent the shell and stop means are positioned on the shell limiting vertical movement of the shafts.

7. In a lifter roof tank having a shell and a vertically movable roof thereover, stabilizing and guide means comprising a plurality of horizontal elongated rollers within the shell, fixed vertical roller guides attached to the shell, roof guides depending from the roof and spaced inwardly from said fixed guides, said rollers each being positioned between and in rolling contact with at least two fixed guides and two roof guides, a pair of flexible members wrapped in opposite directions around ends of each roller, said members being taut and extending in a generally vertical direction with one of said pair attached to upper and lower portions of the shell and the other of said pair being attached to upper and lower portions of the roof, said flexible members being adapted to feed about said rollers and said rollers being adapted to roll between said guides upon movement of the roof relative to the shell.

8. The stabilizing and guide means of claim 7, wherein each flexible member is successively wrapped around the ends of two adjacent rollers.

9. The stabilizing and guide means of claim 7, wherein said rollers form a polygon within the shell with adjacent rollers being spaced vertically and having their ends overlapped and each flexible member is wrapped successively around the ends of adjacent rollers.

10. The stabilizing and guides means of claim 7, wherein each flexible member is attached at one point in the wrapped portion to the roller.

11. The stabilizing and guide means of claim 7, wherein said fixed roller guides each have stop means at their upper and lower ends limiting upward and downward travel of said rollers.

12. The stabilizing and guide means of claim 7, wherein said rollers form a polygon with the ends of the rollers adjacent the shell and said roller guides and roof guides contact the rollers at their ends.

CHRISTIAN ARNE.

No references cited.